US008934117B2

(12) United States Patent
Zhang et al.

(10) Patent No.: US 8,934,117 B2
(45) Date of Patent: Jan. 13, 2015

(54) EQUIPMENT MANAGEMENT SYSTEM

(75) Inventors: Jing Zhang, Fremont, CA (US); Robert B. Evans, Fremont, CA (US)

(73) Assignee: SYNNEX Corporation, Fremont, CA (US)

( * ) Notice: Subject to any disclaimer, the term of this patent is extended or adjusted under 35 U.S.C. 154(b) by 1596 days.

(21) Appl. No.: 11/484,135

(22) Filed: Jul. 10, 2006

(65) Prior Publication Data

US 2008/0007764 A1 Jan. 10, 2008

(51) Int. Cl.
*G06F 3/12* (2006.01)
*H04L 12/26* (2006.01)
*H04L 12/24* (2006.01)
*G06Q 40/00* (2012.01)

(52) U.S. Cl.
CPC ............... *H04L 43/12* (2013.01); *H04L 41/046* (2013.01); *H04L 43/0876* (2013.01)
USPC .......... 358/1.15; 358/1.13; 358/1.14; 705/39; 705/34; 705/40; 705/50; 705/64; 709/217; 709/223; 709/224

(58) Field of Classification Search
None
See application file for complete search history.

(56) References Cited

U.S. PATENT DOCUMENTS

| | | | |
|---|---|---|---|
| 5,239,460 A | | 8/1993 | LaRoche |
| 6,009,412 A | | 12/1999 | Storey |
| 6,049,779 A | | 4/2000 | Berkson |
| 6,529,878 B2 | | 3/2003 | De Rafael et al. |
| 6,681,349 B2 * | 1/2004 | Sekizawa ..................... 714/47.2 |
| 6,940,615 B1 * | 9/2005 | Shima .......................... 358/1.15 |
| 7,124,094 B1 * | 10/2006 | Kobayashi et al. ............ 705/64 |
| 7,203,656 B2 | 4/2007 | Lotvin et al. |
| 7,362,461 B2 * | 4/2008 | Reddy et al. ................. 358/1.15 |
| 7,882,029 B2 * | 2/2011 | White .............................. 705/40 |
| 2001/0021946 A1 * | 9/2001 | Ogami ......................... 709/217 |
| 2001/0039497 A1 * | 11/2001 | Hubbard ............................ 705/1 |
| 2002/0002492 A1 * | 1/2002 | Okazawa ........................ 705/14 |
| 2002/0030846 A1 * | 3/2002 | Moriyama et al. ........... 358/1.15 |
| 2002/0054345 A1 * | 5/2002 | Tomida et al. ............... 358/1.15 |
| 2003/0020951 A1 * | 1/2003 | Minowa et al. .............. 358/1.15 |
| 2003/0053108 A1 * | 3/2003 | Clough et al. ............... 358/1.14 |
| 2003/0133147 A1 * | 7/2003 | Peeters ........................ 358/1.15 |
| 2003/0193685 A1 * | 10/2003 | Kageyama ................... 358/1.14 |
| 2003/0200142 A1 | 10/2003 | Hicks et al. |
| 2004/0080773 A1 * | 4/2004 | Jamison et al. .............. 358/1.14 |
| 2004/0083147 A1 * | 4/2004 | Aoki ............................... 705/34 |
| 2004/0126123 A1 * | 7/2004 | Koga et al. ...................... 399/24 |
| 2004/0130743 A1 * | 7/2004 | Nozato ........................ 358/1.14 |
| 2005/0105130 A1 * | 5/2005 | Hagiuda ...................... 358/1.15 |
| 2005/0151992 A1 * | 7/2005 | Shaw et al. .................. 358/1.14 |
| 2005/0165657 A1 | 7/2005 | Aichroth et al. |
| 2005/0203766 A1 * | 9/2005 | Donaldson ....................... 705/1 |
| 2005/0209917 A1 | 9/2005 | Anderson et al. |
| 2006/0020509 A1 | 1/2006 | Strain et al. |

(Continued)

*Primary Examiner* — David Moore
*Assistant Examiner* — Pawandeep Dhingra
(74) *Attorney, Agent, or Firm* — Carr & Ferrell LLP

(57) ABSTRACT

Systems and methods of management of electronic office equipment through automated monitoring and reporting of usage and status are disclosed. A monitoring agent monitors electronic office equipment on a network and collects usage and status information to send to a control system. The control system can use the usage and status information to compile various reports responsive to the received information. The system allows for the automatic assessment, monitoring, re-supply, maintenance, and billing of networks of printing devices from a variety of different manufacturers. In some embodiments, the system enables a pay per use lease arrangement.

25 Claims, 7 Drawing Sheets

(56) References Cited

U.S. PATENT DOCUMENTS

| | | |
|---|---|---|
| 2006/0053075 A1* | 3/2006 | Roth et al. .................. 705/50 |
| 2006/0064481 A1* | 3/2006 | Baron et al. ................ 709/224 |
| 2006/0116953 A1* | 6/2006 | Davin et al. ................. 705/39 |
| 2006/0215198 A1* | 9/2006 | Yorimoto .................. 358/1.13 |
| 2007/0167204 A1 | 7/2007 | Lyle et al. |
| 2007/0174113 A1 | 7/2007 | Rowen |
| 2007/0226171 A1* | 9/2007 | Medicke et al. .............. 707/1 |
| 2008/0167129 A1 | 7/2008 | Aaron et al. |
| 2008/0208749 A1 | 8/2008 | Wallace et al. |

* cited by examiner

EQUIPMENT MANAGEMENT SYSTEM

BACKGROUND OF THE INVENTION

1. Field of the Invention

The present invention relates generally to an electronic equipment management system for systematically monitoring the usage and status of devices on a computing network.

2. Description of Related Art

Some types of business equipment are typically purchased by users while others are more often leased. For example, copiers are often leased rather than purchased. The preference for leasing copiers is due to the high costs of ownership and the rapid progress of copier technology. In addition, companies that lease copiers typically have service technicians in the field who can check the usage of each copier so that lease rates can be based on usage.

In contrast, other office equipment, such as printers and facsimile machines, are not normally leased. In part, this is because these devices typically do not include features for monitoring use (e.g., page count) and because printers and facsimile machines are not supported by a sufficient number of service personnel in the field. There are, therefore, not enough personnel to read the usage of each machine. Without systems for monitoring and assessing a printer's usage and requirements, it is difficult to find an efficient method to calculate a proper billing under a lease.

Thus, even though business-class, high-volume printers may have ownership costs and technological development rates similar to copiers, there are fundamental barriers to managing printers that are not found in the management of copiers, the industry has, therefore, not adopted a leasing model for printers. There is, therefore, a need for improved methods of monitoring the usage and status of printers and other office equipment.

SUMMARY

Various embodiments of the present invention include systems and methods for supplying and maintaining printing devices by automating monitoring and reporting usage and status of office equipment, including printers, facsimile machines, and/or the like. In various embodiments, an agent installed on an end user's network automatically monitors printing devices on the network, and sends usage and status information to a remote control system. This monitoring may be independent of equipment manufacturer. The remote control system is configured to analyze the sent information and to generate reports for re-supply, maintenance, and invoicing purposes.

In an exemplary embodiment, an agent is installed on a personal computer, or server, of an end user network and is configured to automatically detect printing devices on the network. The agent monitors and records the usage information and in response to certain triggers, encrypts and sends the usage information to a control system. The control system decrypts, analyzes the usage information, identifies the agent, and generates and sends purchase orders for supplies to a supplier. The control system may further provide reports regarding maintenance to a maintenance service provider, reports to a reseller, status reports to the end user, reports regarding invoicing to a lessor, or the like. In various embodiments, this system allows for the automatic assessment, monitoring, re-supply, and maintenance of networks of printing devices from a variety of different manufacturers.

Various embodiments of the invention include a control system comprising an input configured to receive messages from a monitoring agent over a computing network, the messages including usage information relating to a plurality of printers manufactured by a variety of manufacturers, a data analyzer configured to analyze the messages and, in response to the messages, to generate information regarding usage of the plurality of printers, and one or more assembler configured to automatically generate a purchase order, a maintenance request, a reseller report or a lessor report, and to send the purchase order, the maintenance request, the reseller report or the lessor report to a third party responsive to the information regarding usage of the plurality of printers.

Various embodiments of the invention include a management system, comprising a first monitoring agent configured to automatically monitor a first network of printing devices from a variety of manufacturers, to collect usage and status information from the printing devices, and to assemble messages including the usage and status information, and a control system configured to receive the messages, analyze the usage and status information, and to automatically generate and send at least one report responsive to the usage and status information. This management system optionally further comprises a second monitoring agent configured to automatically monitor a second network of printing devices, to collect further usage and status information from the printing devices on the second network, and to assemble messages including the further usage and status information, wherein the control system is further configured to distinguish messages received from the first monitoring agent from messages received from the second monitoring agent.

Various embodiments of the invention include a method comprising receiving a message from a monitoring device via an computing network, the message including information regarding usage of a printer, processing the message to determine the identity of a lessee of the printer, automatically assembling a lessor report in response to the information, the lessor report being configured to charge the lessee for the printer on a fee per use basis, and automatically sending the lessor report to a lessor of the printer.

Various embodiments of the invention include a method of managing a lease, the method comprising automatically monitoring usage and status of a plurality of leased printing devices on a network, using a monitoring agent, automatically sending a message from the monitoring agent to a control system, the message including information regarding the usage and status, receiving the message at the control system, analyzing the message at the control system to determine if any purchase order, maintenance request or report should be generated in response to the message, automatically generating the purchase order, maintenance request or report, and automatically sending the purchase order, maintenance request or report.

DETAILED DESCRIPTION

Various embodiments of the invention include systems and methods for automatically monitoring the status and usage of office equipment over a computer network. This office equipment may include printers, facsimile machines, telephones, computers, copiers, and/or the like. Information gathered through the automatic monitoring may be used for billing, supply, and/or maintenance, as further described herein.

In an exemplary embodiment of the present invention, a software agent monitors the usage and status of office equipment on an end user's network. The software agent then analyzes the collected usage and status data to determine if the collected data should be sent to a remote control system. The usage and status data are compiled into a message and sent to the remote control system. The control system uses the data to compile various reports, including purchase orders for supplies, requests for maintenance service, invoices for billing purposes, and status reports. In some embodiments, the software agent is configured to collect information that facilitates billing on a per usage basis for the office equipment.

Figure 1:
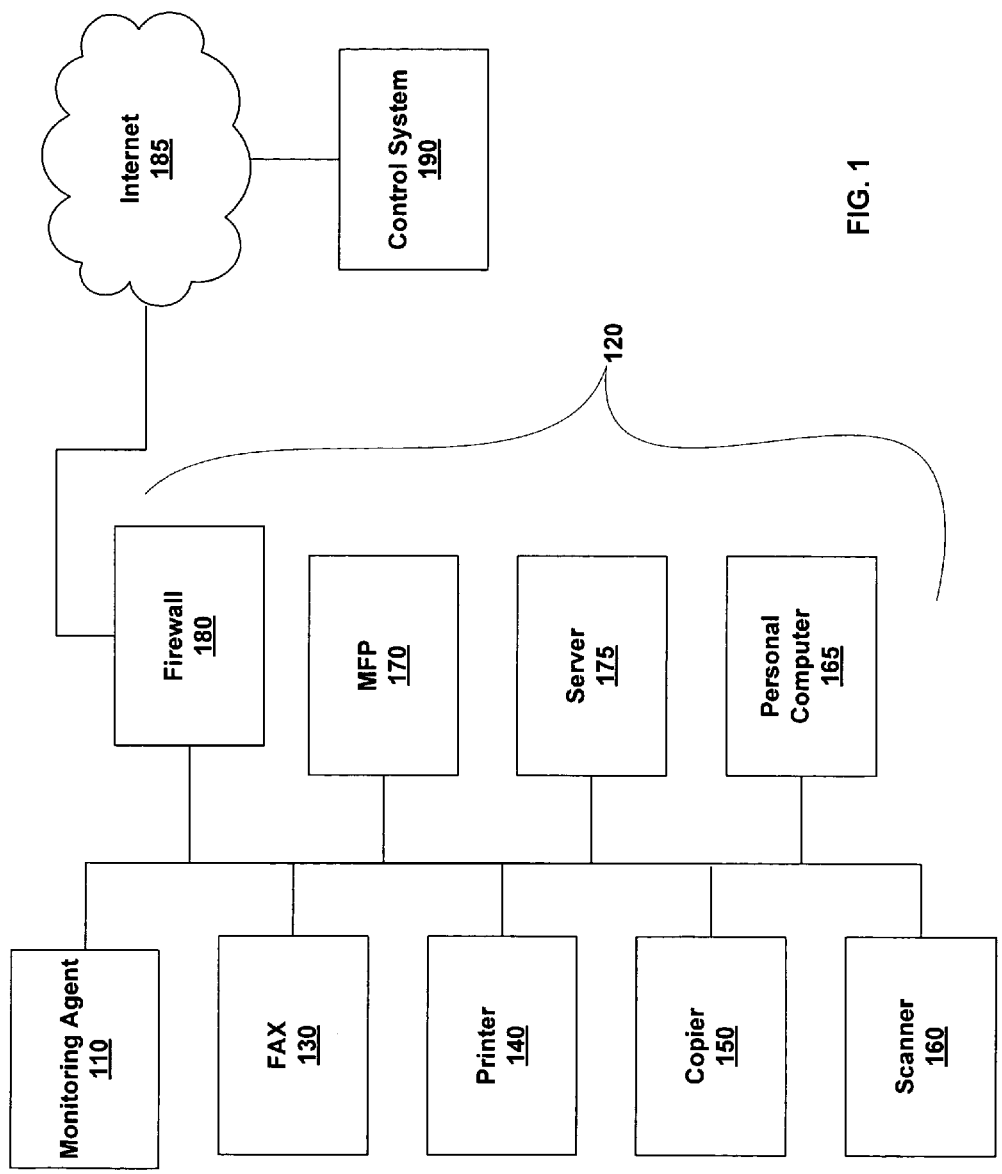
FIG. 1 is a block diagram of an implementation of the present invention on a computerized network, according to various embodiments.

FIG. 1 is a block diagram of an implementation of the present invention on a computerized network, according to various embodiments. These embodiments include a Monitoring Agent 110 installed on an end user Network 120. Monitoring Agent 110 is typically installed on a server, personal computer, router, printer, copier, or the like. Monitoring Agent 110 is configured to monitor for the presence of office equipment, such as printing devices, on Network 120. Network 120 may include different types of office equipment such as, for example, a FAX (facsimile machine) 130, a Printer 140, a Copier 150, a Scanner 160, and/or the like. Network 120 may further include additional devices such as a personal computer 165, a multifunction printer (MFP 170), a Server 175, a Firewall 180, and/or the like. FAX 130, Printer 140 and MFP 170 are examples of printing devices. Alternative embodiments of the invention include a plurality of Monitoring Agent 110 each installed on a different instance of end user Network 120.

In some embodiments, Monitoring Agent 110 is configured to detect a variety of different office equipment, possibly from different manufacturers, on Network 120. As is described further herein, the detection of office equipment from different manufacturers is supported by using a device database including interface information relating to different types of equipment and/or different manufacturers. Using this information, Monitoring Agent 110 is configured to request and receive information from each of the detected office equipment. Such information may include usage and status information. Monitoring Agent 110 is further configured to send the received information, or a summary thereof, over a communication network, such as a telephone network or the Internet 185, to a Control System 190.

As is described further herein, Control System 190 is configured to use information received from Monitoring Agent 110 to schedule maintenance, bill for usage, communicate to third parties, generate purchase orders, order/ship supplies, and/or the like. Control System 190 may be managed by a reseller, supplier, owner, lessor of office equipment, or by a third party providing a service.

Figure 2:
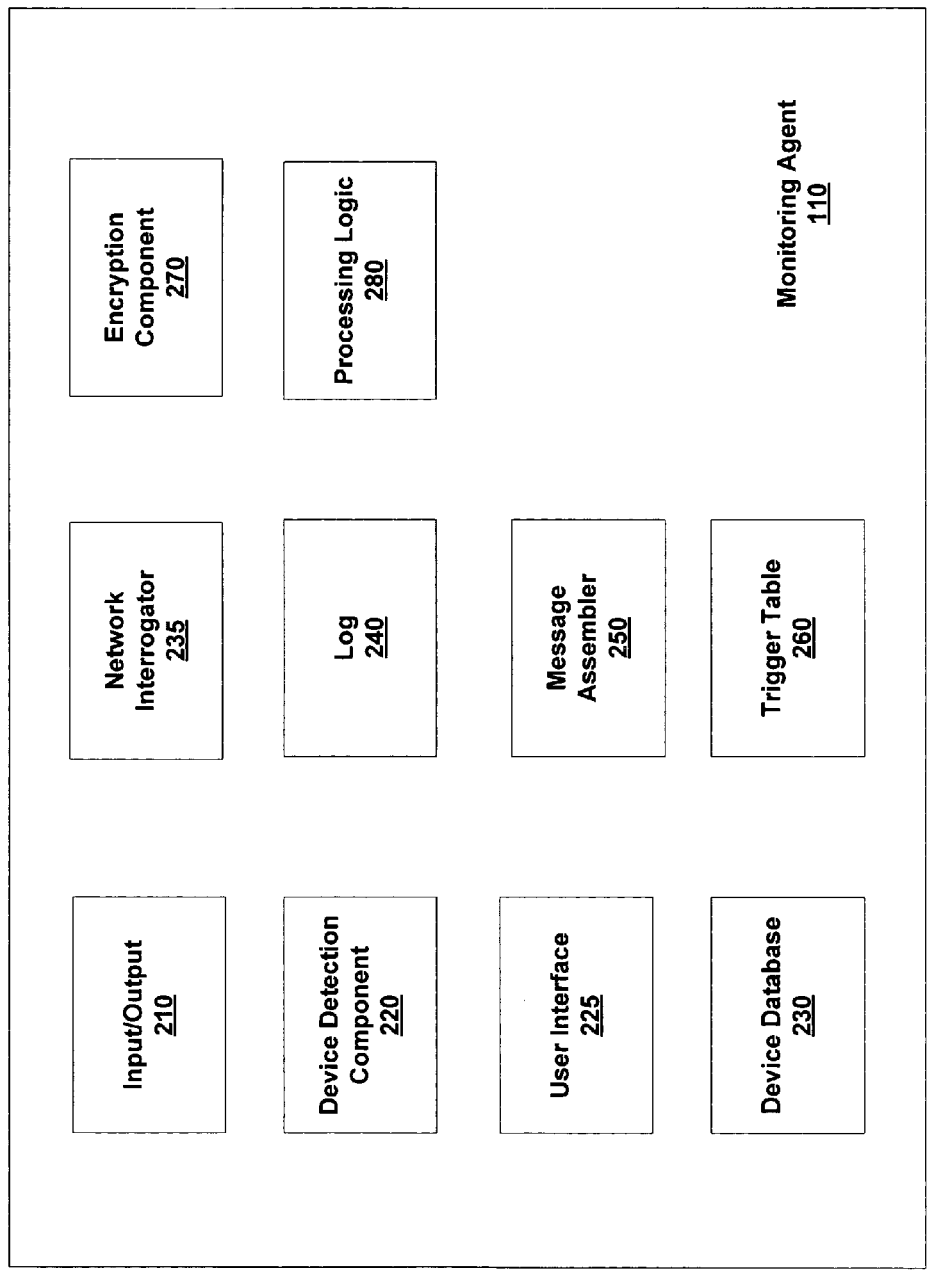
FIG. 2 is a block diagram of a monitoring agent, according to various embodiments of the present invention.

FIG. 2 is a block diagram of Monitoring Agent 110, according to various embodiments of the present invention. Monitoring Agent 110 includes an Input/Output 210 configured to communicate with other elements of Network 120 and with Control System 190. Input/Output 210 may include a network port, a wireless connector, or the like. Input/Output 210 is optionally configured to communicate using an Ethernet or TCP/IP standard. Information communicated through Input/Output 210 may include, for example, signals configured to detect office equipment on Network 120, requests for status information regarding office equipment on Network 120, responses from office equipment on Network 120, reports to Control System 190, and/or the like.

Monitoring Agent 110 further includes an optional Device Detection Component 220 configured to identify office equipment connected to Network 120. For example, Device Detection Component 220 is optionally configured to detect printing devices that have been newly installed onto the network. This detection may be automatic. For example, Device Detection Component 220 may be configured to broadcast a message onto the network on a periodic basis to solicit responses from any connected office equipment.

In alternative embodiments, an optional User Interface 225 is configured for a user to input data identifying devices to be monitored using Monitoring Agent 110. The ability of a user to add or remove devices to be monitored is optionally password protected. The identities of devices on Network 120, to be monitored by Monitoring Agent 110, are optionally stored in a secure file within Monitoring Agent 110.

Monitoring Agent 110 further includes a Device Database 230 configured to store information about various types of office equipment, optionally from different manufacturers.

In some embodiments, Device Database 230 is installed and/or updated using User Interface 225 and/or by providing data directly to Monitoring Agent 110. For example, Device Database 230 may be updated by installing a device driver on Network 120. In alternative embodiments, Device Database 230 is updated and/or installed by communications from other devices, such as Control System 190 or over the Internet 185.

Device Database 230 includes information relating to the command and communications protocols of various office equipment. For example, Device Database 230 may include commands and syntax for requesting information from different equipment. As the communication capabilities of various office equipment may be substantially different, the possible commands associated with different equipment typically varies. For example, some equipment is configured to merely provide a general status, some equipment is configured to provide a print count, while more advanced equipment is configured to also provide a toner low message for several different toner types.

The information stored in Device Database 230 is used by a Network Interrogator 235 to gather information from each monitored device on Network 120. Network Interrogator 235 is configured to gather information regarding usage and/or status of office equipment on Network 120. In some embodiments, Network Interrogator 235 is configured to use commands stored in Device Database 230 to query specific equipment for information. For example, in some embodiments, Network Interrogator 235 may send a command to Printer 140 configured to cause Printer 140 to send a reply message, the reply message including status information, usage information, and/or the like.

In some embodiments, Network Interrogator 235 is configured to monitor traffic on Network 120 in order to determine usage and/or status of equipment. For example, Network Interrogator 235 may be configured to monitor data packets sent between Printer 140 and Personal Computer 165. From these data packets, Network Interrogator 235 may estimate a number of pages printed by Printer 140, that Printer 140 has not been used for a period of time, that Printer 140 is sending an error message to Personal Computer 165, and/or the like.

In some embodiments, Network Interrogator 235 is configured to determine the identity of users of office equipment. For example, Network Interrogator 235 may be configured to determine usage of Printer 140 on an individual user basis. The identification of users may include identification of Internet Protocol (IP) Addresses, Media Access Control (MAC) addresses, user login IDs, user passwords, agents running on user's personal computers, or the like, all of which may be unique to an individual user. In some embodiments, Network Interrogator 235 is configured to gather samples of material sent to office equipment by specific users.

The information that Network Interrogator 235 may gather regarding specific office equipment is typically dependent on the capabilities of that office equipment. For example, some office equipment is configured to provide more or different information than other office equipment. In some embodiments, Network Interrogator 235 is configured to determine what information it may gather regarding different devices, and then to gather that information, despite the fact that different information may be gathered from each device.

Typically, the operation of Network Interrogator 235 is automatic. As such, in some embodiments, no action is required on the behalf of a user or Control System 190 in order for Network Interrogator 235 to gather data.

The information about office equipment gathered by Network Interrogator 235 is stored in a Log 240. Log 240 optionally includes a secure file and/or database. For example, in some embodiments, Log 240 includes a database having a separate table associated with each office equipment detected on Network 120. Log 240 may include all information gathered using Network Interrogator 235, a subset of interest of the gathered information, and/or a summary of the gathered information. In various embodiments, Log 240 is accessible, optionally securely, via User Interface 225 and/or the Internet 185.

Monitoring Agent 110 further includes a Message Assembler 250 configured to prepare a message or messages for communication to Control System 190. Message Assembler 250 is configured to access data within Log 240, and to include these data, or a summary thereof, in a message. This message may include text, XML, HTML or some other encoding.

Message Assembler 250 is further configured to address the message to Control System 190, for example, using a URL (Universal Resource Locator), an e-mail address, an IP address, a MAC address, and/or the like, and to send the message using this address. For example, in one embodiment, Message Assembler 250 is configured to assemble an e-mail message to Control System 190, the e-mail including status information derived from Printer 140 and optionally stored in Log 240. In one embodiment, Message Assembler 250 is configured to generate a summary of usage information regarding Printer 140, Copier 150, and/or Scanner 160, and to send this information to an IP address of Control System 190.

Message Assembler 250 is optionally configured to send messages responsive to specific events. For example, Message Assembler 250 may be configured to send usage information on a monthly basis and to send status information immediately when an error status is detected. The criteria for when messages should be sent are stored in an optional Trigger Table 260. Trigger Table 260 may include instructions to send messages when specific events occur. For example, when an error status is detected, when usage reaches a predetermined level, when office equipment is not used for a predefined period, when a low ink/toner level is detected, when a printing device goes offline, on a user defined trigger, and/or the like. Trigger Table 260 may also include instructions to send messages on a periodic basis. For example, messages including usage data may be sent weekly or monthly. Messages including status data may be sent hourly.

The instructions within Trigger Table 260 are optionally dependent on the type of office equipment. For example, the instructions may indicate that information concerning usage of Printer 140 should be sent weekly while information concerning usage of FAX 130 should be sent monthly. In some embodiments, Trigger Table 260 includes instructions to send a message whenever office equipment is added to or removed from Network 120.

In alternative embodiments, Trigger Table 260 is not included in Monitoring Agent 110. In some embodiments, Monitoring Agent 110 is configured to send messages to Control System 190 whenever usage and/or status data is available, or on a periodic basis. For example, Monitoring Agent 110 may be configured to send usage data once an hour or once a day, and to send negative status data as soon as it is received. In some embodiments, Trigger Table 260 is included in Control System 190 and is used to determine when reports, purchase orders, or maintenance requests should be sent.

Monitoring Agent 110 optionally includes an Encryption Component 270. Encryption Component 270 may be configured to encrypt Log 240, encrypt messages assembled by Message Assembler 250, and/or the like. In some embodiments, Encryption Component 270 is further configured to decrypt messages received from Control System 190.

Monitoring Agent 110 further optionally includes Processing Logic 280. Processing Logic 280 may include a microprocessor, memory, firmware, software, and/or the like. Processing Logic 280 is configured to execute other elements of Monitoring Agent 110, such as Network Interrogator 235 and Message Assembler 250.

In various embodiments, Monitoring Agent 110 is configured to communicate through Firewall 180. For example, in some embodiments, Monitoring Agent 110 is configured to receive information from Control System 190 in a secure manner that satisfies the requirements of security protocols according to Firewall 180. In some embodiments, Monitoring Agent 110 is configured for one-way communication from Monitoring Agent 110 to Control System 190. In these embodiments, Monitoring Agent 110 is configured to operate without instructions or other direct input from Control System 190. Thus, Monitoring Agent 110 may be configured to send messages independent of any action by Control System 190. One-way communication may be advantageous in that Firewall 180 need not be configured to accept communication for Monitoring Agent 110 from outside Network 120.

Figure 3:
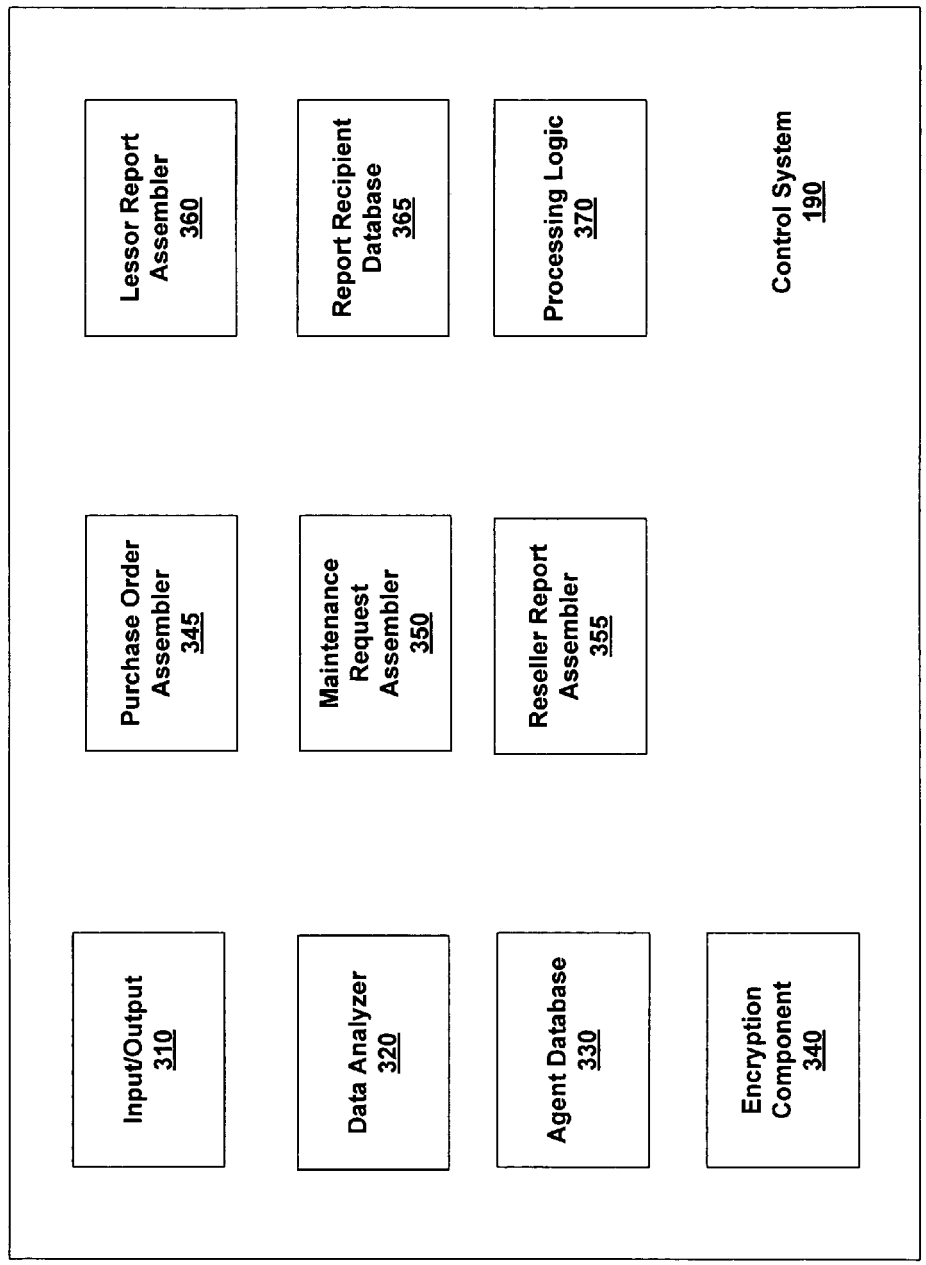
FIG. 3 is a block diagram of a control system, according to various embodiments of the present invention.

FIG. 3 is a block diagram of Control System 190, according to various embodiments of the invention. Control System 190 is configured to receive messages from one or more instance of Monitoring Agent 110, to analyze the information in these messages, and to assemble and deliver reports based on this information. Control System 190 includes an Input/Output 310, a Data Analyzer 320, an optional Agent Database 330, and an optional Encryption Component 340, configured to process messages received from Monitoring Agent 110. Control System 190 optionally further includes a Purchase Order Assembler 345, a Maintenance Request Assembler 350, a Reseller Report Assembler 355, a Lessor Report Assembler 360, and/or a Report Recipient Database 365, configured to generate output for use by various parties. Finally, Control System 190 includes a Processing Logic 370, which may be similar to Processing Logic 280.

Input/Output 310 is configured to receive information via a communication network such as Internet 185, another computing network, a telephone network, and/or the like. Input/Output 310 is configured to receive messages from Monitoring Agent 110 and optionally to send messages to Monitoring Agent 110. As is further described herein, Input/Output 310 is optionally configured to send messages to other parties.

Data Analyzer 320 is configured to receive messages from Monitoring Agent 110 and parse the contents of these messages. In some embodiments, Data Analyzer 320 uses Encryption Component 340 to decrypt the contents or confirm the authenticity of these messages. In some embodiments, Data Analyzer 320 is further configured to confirm that messages are only accepted from instances of Monitoring Agent 110 included in Agent Database 330. For example, when a message is received it may be decrypted using Encryption Component 340 and the identity of the sender may be confirmed using Agent Database 330. In some instances, Data Analyzer 320 is configured to identify a particular instance of Monitoring Agent from among a plurality of Monitoring Agents 110. Each of these plurality of Monitoring Agents 110 may be installed on a different instance of Network 120 and/or associated with a different lessee.

The contents of received messages are typically saved for further use. In some embodiments, Data Analyzer 320 is further configured to process the received information prior to saving. For example, Data Analyzer 320 may be configured to perform statistical analysis of the received information, generate a summary of the received information, or aggregate the received information. If received information is on a per user basis, Data Analyzer 320 may be configured to generate a summary of the per user information for all users of Network 120. Typically, the information is stored in association with a particular network, user, customer, monitoring agent, lessee, or the like.

Control System 190 is configured to use the information processed and optionally saved by Data Analyzer 320 to generate one or more outputs. These outputs may include purchase orders, maintenance requests, usage reports, financial reports, and/or the like.

Purchase Order Assembler 345 is configured to generate purchase orders in response to messages processed by Data Analyzer 320. For example, in some embodiments, if Monitoring Agent 110 sends a message indicating that toner in Printer 140 is low, then Purchase Order Assembler 345 will generate a purchase order for more toner. This purchase order may use an identity of the instance of Monitoring Agent 110 to determine an address to which the purchase order should be sent. The purchase order is optionally sent in an electronic format, for example, via e-mail. Control System 190 is optionally configured to wait for an approval before sending the purchase order to a supplier. Alternatively, Control System 190 may be configured to send the purchase order to a lessor, a supplier and/or an end user contemporaneously.

Maintenance Request Assembler 350 is configured to prepare and send a maintenance request to a service provider in response to information received from Monitoring Agent 110 and processed by Data Analyzer 320. The maintenance request may include a priority, a description of the maintenance needed, and a reason for the request. In various embodiments, the maintenance request may also be sent to a user, an owner/lessor, or other party. The maintenance request may further include an estimated cost of the maintenance.

Lessor Report Assembler 360 is configured to prepare and send reports to a lessor (e.g., an owner), responsive to information sent by Monitoring Agent 110 and processed by Data Analyzer 320. Reports prepared by Lessor Report Assembler 360 optionally include usage information or other information on which a lessor may wish to charge or value a lease. For example, a lessor may wish to charge for the use of office equipment, at least in part, on usage of the office equipment. Further, a lessor may wish to evaluate the value of a lease or appropriateness of particular office equipment for a particular customer based on usage. In some embodiments, reports prepared by Lessor Report Assembler 360 include amounts to be charged by a lessor to a lessee. The information include in reports prepared by Lessor Report Assembler 360 can be on a user specific basis, a per office equipment basis, a per Monitoring Agent 110 basis, and/or per customer basis.

Reseller Report Assembler 355 is configured to prepare and send reports similar to those prepared and sent by Lessor Report Assembler 360. These reports may be of use in embodiments wherein a reseller receives a commission on a lease. Reports generated by Reseller Report Assembler 355 optionally include the value of this commission.

In some embodiments, Report Recipient Database 365 includes a list of recipients for various purchase orders, maintenance requests, and/or reports. Because information may be received from a number of different instances of Monitoring Agent 110, each associated with a different customer or end user, the output of Control System 190 may be sent to a variety of different parties responsive to the source of the information.

In various embodiments, the operation of Control System 190, including generation of purchase orders, maintenance requests, and various reports is automatic, e.g., these operations are performed without the need for further human intervention.

In general, the output of Control System 190 may include, but is not limited to, evaluation information for a piece of office equipment such as Printer 140 or MFP 170, a number of pages printed, a calculated invoice amount for a billing period, an amount of ink/toner required for the next billing period, a maintenance report, trouble-shooting information such as offline or disconnected status, and/or replacement information for various parts. In some embodiments, reports include security information confirming the presence of office equipment. Control System 190 is configured to provide the appropriate information to appropriate recipients. In some embodiments, reports are sent to lessees, either directly by Control System 190 or through another report recipient.

When information is received by Control System 190 from one or more Monitoring Agent 110, each assembler is optionally configured to receive the output of Data Analyzer 320 and, using Report Recipient Database 365, produce and send any called-for reports responsive to the information. This process may be automatic.

In one illustrative embodiment, Monitoring Agent 110 determines a number of pages that have been printed using Printer 140 during a billing period. This information is sent to Control System 190 through the Internet 185. At Control System 190, the information is analyzed, and reports are produced. These reports include a report to a lessor including an amount to charge a lessee of Printer 140, a report to a reseller indicating a commission to be received, and a purchase order to a supplier indicating an amount of paper and toner to order for the next billing cycle. The purchase order is optionally approved by the lessor and/or the lessee prior to fulfillment.

Figure 4:
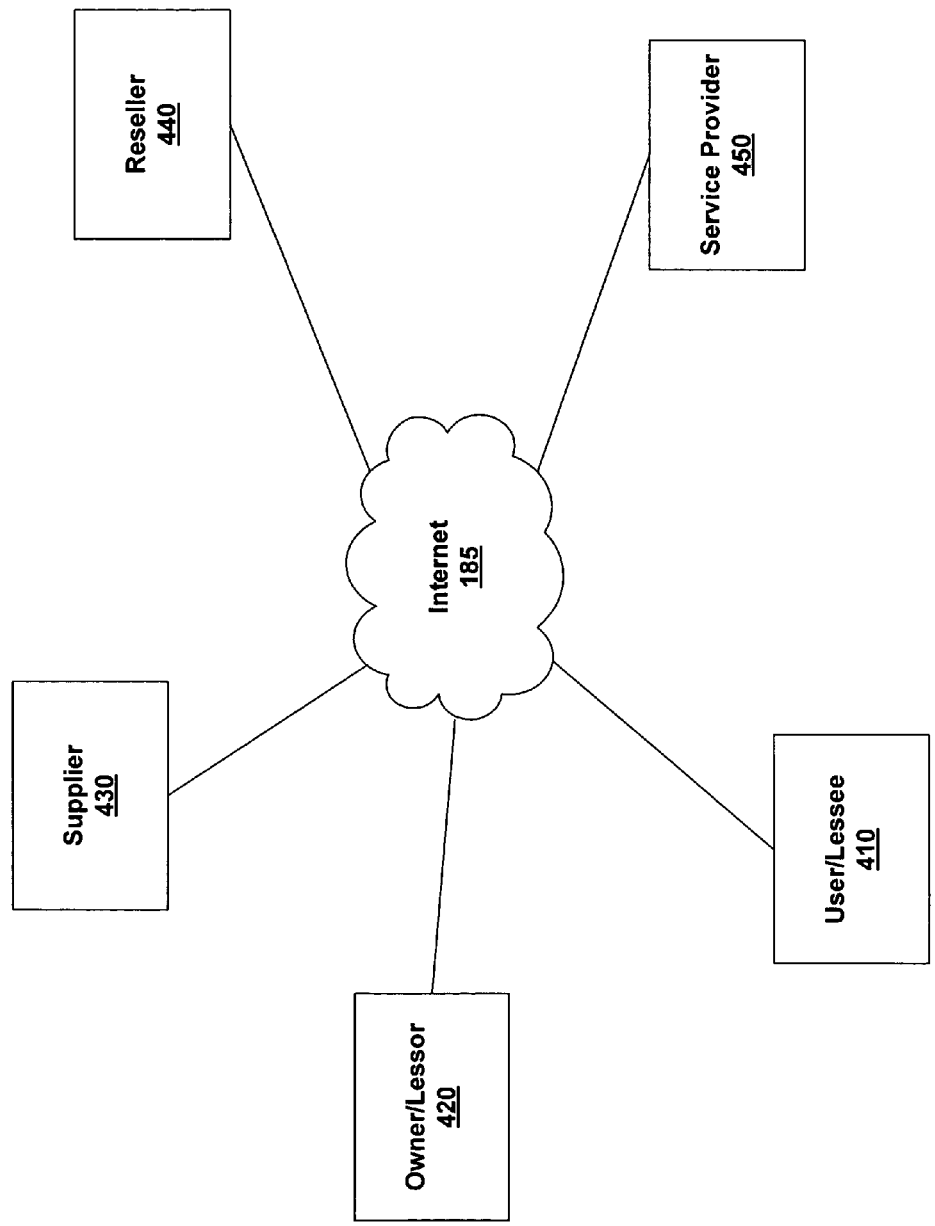
FIG. 4 is a block diagram of parties that may receive information generated by the control system of FIG. 3, according to various embodiments.

FIG. 4 is a block diagram of parties that may receive information generated by Control System 190, according to various embodiments. These parties include a User/Lessee 410, an Owner/Lessor 420, a Supplier 430, a Reseller 440, and/or a Service Provider 450. User/Lessee 410 may be an individual user of office equipment or a customer. For example, User/Lessee 410 may be a corporation leasing Printer 140 among a number of printers.

Owner/Lessor 420 is a party that owns and/or leases office equipment monitored by Control System 190. In some embodiments, an agreement between User/Lessee 410 and Owner/Lessor 420 provides that a printer is to be paid for on a per use basis as automatically determined using Monitoring Agent 110 and Control System 190.

Supplier 430 is a party who supplies consumables for office equipment, such as, for example, paper, toner, and/or replacement parts for Printer 140. Reseller 440 is a party who sells office equipment or arranges leases of office equipment. In some embodiments, Reseller 440 receives a commission based on usage of Printer 140. This commission is optionally determined using Monitoring Agent 110 and Control System 190. Service Provider 450 is a party that provides service (e.g., maintenance) of office equipment such as Printer 140.

In various embodiments, Control System 190 may be disposed within or managed by any of Owner/Lessor 420, Supplier 430, Reseller 440, and/or Service Provider 450.

Figure 5:
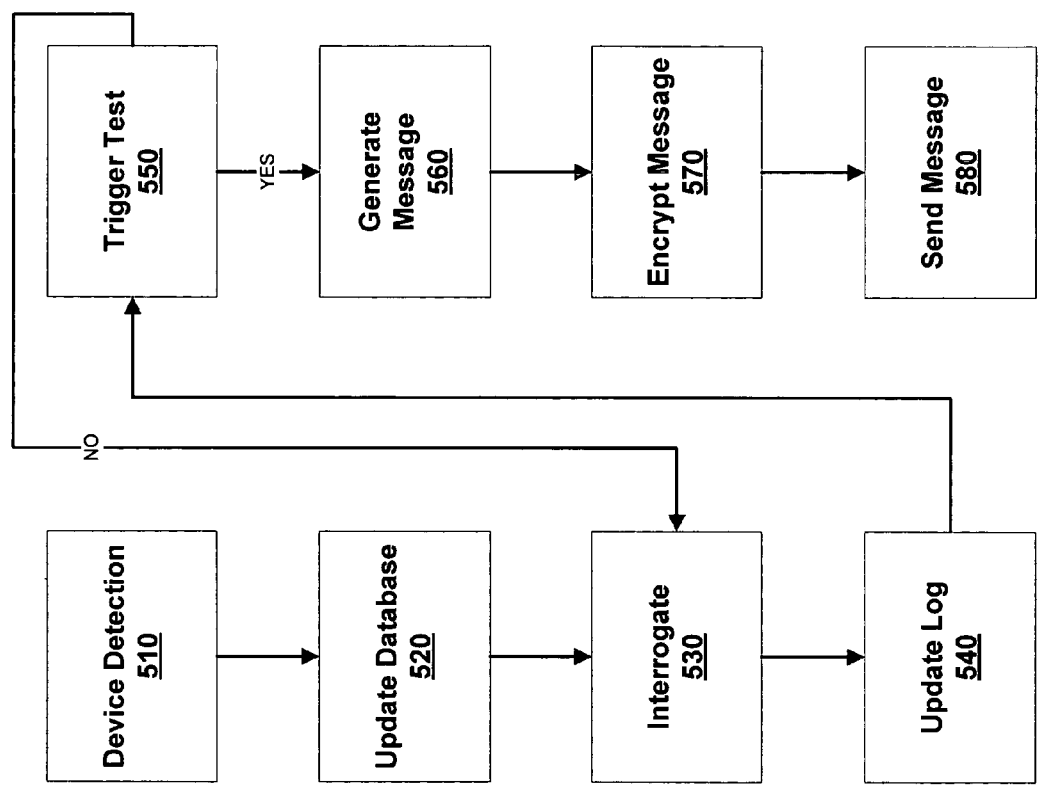
FIG. 5 is a flow chart depicting a method of operation of a monitoring agent, according to various embodiments of the present invention.

FIG. 5 is a flow chart depicting a method of operation of Monitoring Agent 110, according to various embodiments of the present invention. In this method, office equipment is detected on a computer network, the usage and/or status of the detected office equipment is determined. If predetermined criteria are satisfied, information about the usage and/or status is included in a message and the message is sent to Control System 190.

In an optional Device Detection Step 510, Device Detection Component 220 is used to detect the presence of new office equipment on Network 120. This detection may occur either automatically or through a user interface. For example, in some embodiments, Device Detection Component 220 is configured to automatically continuously, or periodically, monitor Network 120 for the presence of new office equipment (and/or the disappearance of office equipment). In other embodiments, Device Detection Component 220 is configured to receive an indication of new devices from a user through User Interface 225.

In an Update Database Step 520, Log 240 and/or Device Database 230 are updated to reflect the presence of the new office equipment whose presence was detected in Device Detection step 510. For example, Update Database Step 520 may include updating Log 240 to indicate a time/date at which the new office equipment was installed. Update Database Step 520 may include receiving information from a device driver installed by a user. Device Detection Step 510 and Update Database Step 520 are optionally repeated in parallel with other steps.

In an Interrogate Step 530, Monitoring Agent 110 is used to interrogate the status/and or usage of office equipment on Network 120. For example, Monitoring Agent 110 may be used to determine how many pages have been printed using Printer 140 or a toner level within FAX 130. This interrogation is optionally made using information stored within Device Database 230. In some embodiments, Interrogate Step 530 is performed by monitoring network traffic and determining or estimating usage from this monitoring. In some embodiments, Interrogate Step 530 is performed by sending specific commands to office equipment and receiving replies to these commands.

In an Update Log Step 540, Log 240 is updated using usage and/or status information learned in Interrogate Step 530. Update Log Step 540 is optional when the information is immediately processed by Message Assembler 250.

In a Trigger Test Step 550, it is determined whether the information added to Log 240 in Update Log Step 540 results in a message trigger, e.g., meets criteria that indicate that a message should be sent from Monitoring Agent 110 to Control System 190. If no message is to be sent, then the method returns to Interrogate Step 530. If a message is to be sent, then a Generate Message Step 560 is executed. In Generate Message Step 560, a message including information from Log 240 is assembled using Message Assembler 250.

In an optional Encrypt Message Step 570, the message assembled in Generate Message Step 560 is encrypted. In a Send Message Step 580, the message assembled in Generate Message Step 560 is sent via Input/Output 210 to Control System 190.

Figure 6:
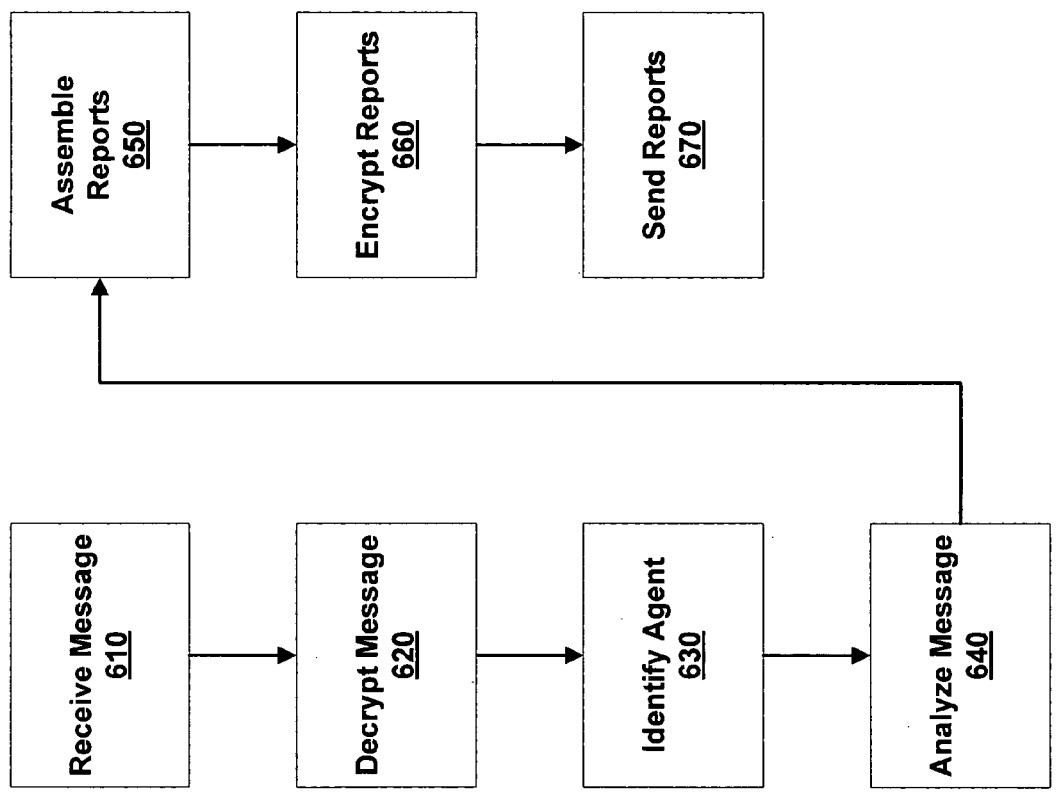
FIG. 6 is a flow chart depicting a method of operation of a control system, according to various embodiments of the present invention.

FIG. 6 is a flow chart depicting a method of operation of Control System 190, according to various embodiments of the present invention. In this method, a message is received from Monitoring Agent 110 and processed using Data Analyzer 320. In response to information included in the message, one or more outputs are then produced by Control System 190.

In a Receive Message Step 610, a message is received from Monitoring Agent 110. As is described further herein, this message can include information regarding status and/or usage of one or more pieces of office equipment. In some embodiments, the message received in Receive Message Step 610 is received without any prior action by Control System 190, e.g., the message is sent automatically without a request from Control System 190.

In an optional Decrypt Message Step 620, the message received in Receive Message Step 610 is decrypted using Encryption Component 340. In an Identify Agent Step 630, information within the message is used to identify the particular instance of Monitoring Agent 110 from which the message was sent. This information may include a MAC address, IP address, serial number, index value, key, and/or the like. In some embodiments, Agent Database 330 is used to correlate this information with a particular instance of Monitoring Agent 110. In some embodiments, Identify Agent Step 630, alternatively or additionally, includes identification of Network 120, Printer 140, User/Lessee 410 and/or the like.

In an Analyze Message Step 640, the information within the message relating to usage and/or status is analyzed using Data Analyzer 320. This analysis may include a determination of what output should be generated by Control System 190 in response to the information within the message. Report Recipient Database 365 is optionally used to make this determination.

In an Assemble Reports Step 650, one or more reports, purchase orders, and/or maintenance requests are assembled. This assembly may be performed using Purchase Order Assembler 345, Maintenance Request Assembler 350, Reseller Report Assembler 355, Lessor Report Assembler 360, or the like.

In an optional Encrypt Reports Step 660, one or more of the reports, purchase orders, and/or maintenance requests assembled in Assemble Reports Step 650 are encrypted using Encryption Component 340.

In a Send Reports Step 670, the reports assembled in Assemble Reports Step 650 are sent to User/Lessee 410, Owner/Lessor 420, Supplier 430, Reseller 440, and/or Service Provider 450. These reports are optionally sent automatically and/or via the Internet 185.

Figure 7:
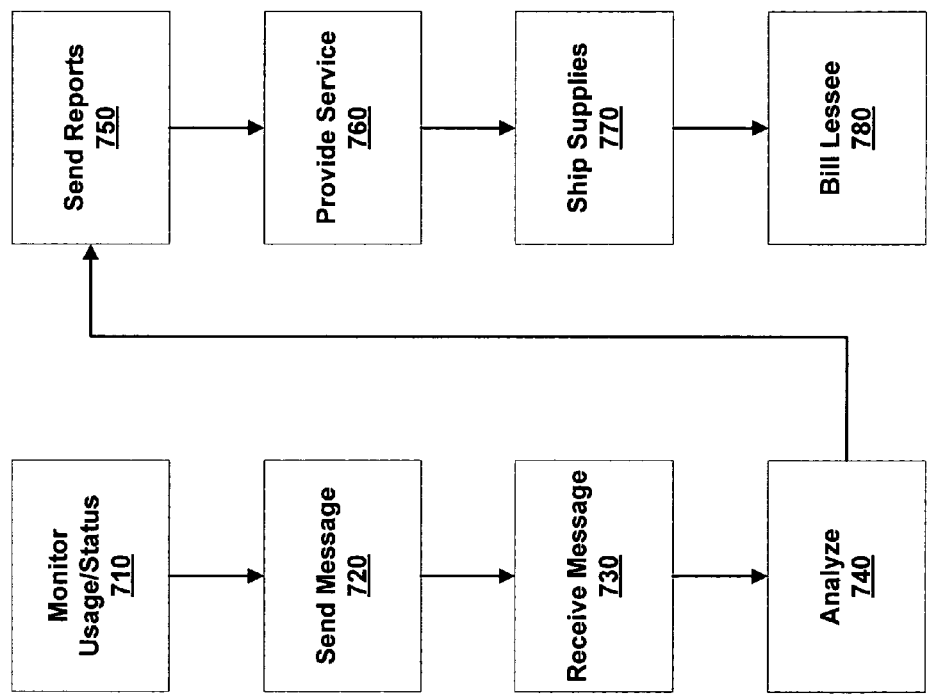
FIG. 7 is a flow chart depicting a method of monitoring a status and/or usage of office equipment, according to various embodiments of the present invention.

FIG. 7 is a flow chart depicting a method of monitoring a status and/or usage office equipment, according to various embodiments of the present invention. In this method, Monitoring Agent 110 and Control System 190 are used together to manage office equipment and optionally to provide transactions under a lease agreement.

In a Monitor Usage/Status Step 710, the office equipment is monitored using Monitoring Agent 110. In a Send Message Step 720, a message is sent from Monitoring Agent 110 to Control System 190 in response to the monitoring of Monitor Usage/Status Step 710. Further details of Monitor Usage/Status Step 710 and Send Message Step 720 are illustrated by the steps shown in FIG. 5.

In a Receive Message Step 730, the message sent in Send Message Step 720 is received by Control System 190. In an Analyze Step 740, the message received in Receive Message Step 730 is analyzed using Data Analyzer 320. In a Send Reports Step 750, one or more purchase order, maintenance request, and/or report are sent by Control System 190 in response to the analysis of Analyze Step 740. Further details of Receive Message Step 730, Analyze Step 740 and Send Reports Step 750 are illustrated by the steps shown in FIG. 6. Send Reports Step 750 may be performed sometime after Receive Message Step 730.

In an optional Provide Service Step 760, maintenance of office equipment on Network 120 is provided in response to a maintenance request sent in Send Reports Step 750. This maintenance is typically provided by Service Provider 450. In some embodiments, the cost of the maintenance is automatically billed to Owner/Lessor 420 or User/Lessee 410.

In an optional Ship Supplies Step 770, supplies are shipped in response to a purchase order sent in Send Reports Step 750. This purchase order may have been approved by other parties, such as User/Lessee 410 or Owner/Lessor 420. In some embodiments, the purchase order is based on a predicted need for supplies.

In an optional Bill Lessee Step 780, User/Lessee 410 is invoiced based on a reports sent in Send Reports Step 750. This invoice is optionally part of a lease including a pay/use component. The lease may be for FAX 130, Printer 140, Copier 150, Scanner 160, MFP 170, Personal Computer 165, Server 175, and/or the like. The lease may be for several different printers from several different manufacturers.

Several embodiments are specifically illustrated and/or described herein. However, it will be appreciated that modifications and variations are covered by the above teachings and within the scope of the appended claims without departing from the spirit and intended scope thereof. For example, while printers, copiers, facsimile machines, etc. are characterized herein as office equipment, the term "office equipment" is meant to characterize a type of equipment not an equipment location. Thus, the scope of this invention and the claims are intended to cover such equipment in other environments such as a home, factory, or the like. For example, Network 120 may be a city wide or company wide network including equipment in many different types of locations. Elements of Monitoring Agent 110 and Control System 190 may be embodied in hardware, software or firmware. For example, in various embodiments, one or more elements of Monitoring Agent 110 and Control System 190 are embodied in logic stored on computer readable media.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A control system comprising:
an interface configured to receive messages from a monitoring and recording agent over a computing network, the monitoring and recording agent being configured to:
automatically detect a plurality of printers in the computing network, each of the plurality of printers manufactured by a variety of manufacturers, the automatic detection including the detection of printers that have been newly installed onto the computing network,
broadcast a message onto the computing network on a periodic basis to solicit responses from each of the detected printers,
collect usage information from each of the detected printers in the computing network, the usage information determined on an individual user basis using an identifier unique to the individual user, the usage information associated with a lease rate given to each of the detected printers, the usage information used to establish the lease rate for the individual user, the usage information recorded by the control system, and
automatically generate messages including the usage information collected from the detected printers in the computing network and recorded by the control system;
a memory configured to store a report recipient database including information concerning a plurality of report recipients, each report recipient being designated to receive a type of report;
a processor for executing instructions stored in memory;
a data analyzer executable by the processor to:
analyze the usage information in received messages, and
determine a type of report associated with the usage information relating to the plurality of printers;
one or more assemblers executable by the processor to:
automatically generate a report in accordance with the determined type of report, and send the report over the computing network to the designated report recipient associated with the type of report;
an agent database accessible by the data analyzer to identify the monitoring and recording agent; and
a second monitoring and recording agent executable by the processor to:
automatically monitor a second network of printing devices,
automatically record the second network of printing devices,
collect further usage information and status information from the printing devices on the second network,
record the further usage information and status information from the printing devices on the second network, and
assemble messages including the further usage information and status information, wherein the control system is further configured to distinguish messages received from the first monitoring and recording agent from messages received from the second monitoring and recording agent.

2. The control system of claim 1, wherein the one or more assemblers are configured to generate a lessor report.

3. The control system of claim 2, wherein the lessor report includes information regarding usage of a member of the plurality of printers.

4. The control system of claim 1, wherein the one or more assemblers are configured to generate a purchase order and a maintenance request.

5. The control system of claim 1, wherein the one or more assemblers are configured to generate a maintenance request and a lessor report.

6. A management system comprising:
 a device in a computing network, the device including a first monitoring and recording agent executable by a processor to:
  automatically detect and monitor a first network of printing devices from a variety of manufacturers, the automatic detection including the detection of printers that have been newly installed onto the computing network,
  broadcast a message onto the computing network on a periodic basis to solicit responses from each of the detected printers,
  automatically record a first network of printing devices from the variety of manufacturers,
  collect usage information and status information from the printing devices, the usage information determined on an individual user basis using an identifier unique to the individual user, the usage information associated with a lease rate given to each of the printing devices, the usage information used to establish the lease rate for the individual user, and
  assemble messages including the usage information and status information;
 a control system configured to:
  record the usage information and status information from the printing devices, the usage information and status information from the printing devices collected by the management system,
  store a report recipient database in memory, the report recipient database including information concerning a plurality of report recipients, each report recipient being designated to receive a type of report, the type of report selected from the group comprising a purchase order, a maintenance request, a reseller request, and a lessor report,
  receive the messages sent by the first monitoring and recording agent over a computing network, the first monitoring and recording agent being identified by a data analyzer, the data analyzer made accessible to an agent database, and
  execute instructions stored in memory, wherein execution of the instructions by a processor of the control system:
   analyzes the usage and status information,
   determines a type of report associated with the usage and status information,
   automatically generates a report in accordance with the determined type of report, and
   sends at least one report over the computing network to the designated report recipient associated with the type of report, and
 a second monitoring and recording agent executable by the processor to:
  automatically monitor a second network of printing devices,
  automatically record the second network of printing devices,
  collect further usage information and status information from the printing devices on the second network,
  record the further usage information and status information from the printing devices on the second network, and
  assemble messages including the further usage information and status information, wherein the control system is further configured to distinguish messages received from the first monitoring and recording agent from messages received from the second monitoring and recording agent.

7. The management system of claim 6, wherein the control system is further configured to automatically send the at least one report to a lessor of the printing devices.

8. The management system of claim 6, wherein the control system is further configured to automatically generate and send a purchase order and a maintenance request in accordance with a determined response.

9. The management system of claim 6, wherein the first monitoring and recording agent is configured to automatically detect printing devices on the first network.

10. The management system of claim 6, wherein the at least one report includes usage for a plurality of types of office equipment from a variety of manufacturers.

11. The management system of claim 6, wherein the first monitoring and recording agent includes a trigger table configured to store conditions under which the first monitoring and recording agent should send messages to the control system.

12. The management system of claim 6, wherein the at least one report includes that one of the printing devices was removed from the first network.

13. The management system of claim 6, wherein the first monitoring and recording agent is configured to send the messages to the control system without receiving any messages from the control system.

14. A method comprising:
 receiving a message from a monitoring and recording device over a computing network, the monitoring and recording device configured to:
  automatically detect a plurality of printers in the computing network, each of the plurality of printers manufactured by a variety of manufacturers, the automatic detection including the detection of printers that have been newly installed onto the computing network,
  broadcast a message onto the computing network on a periodic basis to solicit responses from each of the detected printers,
  collect usage information from each of the detected printers in the computing network, the usage information determined on an individual user basis using an identifier unique to the individual user, the usage information associated with a lease rate given to each of the detected printers, the usage information used to establish the lease rate for the individual user,
  record the usage information from each of the detected printers in the computing network, and
  automatically generate the message, the message including information regarding usage of a printer;
 storing a report recipient database in memory, the report recipient database including information concerning a plurality of lessees and associated lessors;

executing instructions stored in memory, wherein execution of the instructions by a processor:
   analyzes the printer usage information in a received message;
   determines an identity of the lessee of the printer; and
   automatically assembles a lessor report in response to the information, the lessor report including lessee charges for the printer on a fee per use basis; and
automatically sending the lessor report over the computing network to the lessor of the printer, the lessor being associated with the lessee in the report recipient database;
identifying the monitoring and recording agent, made possible by giving a data analyzer access to an agent database; and
a second monitoring and recording agent executable by the processor to:
   automatically monitor a second network of printing devices,
   automatically record the second network of printing devices,
   collect further usage information and status information from the printing devices on the second network,
   record the further usage information and status information from the printing devices on the second network, and
   assemble messages including the further usage information and status information, wherein a control system is further configured to distinguish messages received from the first monitoring and recording agent from messages received from the second monitoring and recording agent.

15. The method of claim 14, wherein the received message is encrypted and further including decrypting the message.

16. The method of claim 14, wherein the message further includes status information regarding the printer.

17. The method of claim 14, wherein the computer network is an Internet.

18. The method of claim 14, further including automatically generating a purchase order in response to the message and sending the purchase order to a supplier.

19. The method of claim 14, further including automatically generating a maintenance request in response to the message and sending the maintenance request to a service provider.

20. The method of claim 14, wherein the message is sent independently of any action by the control system.

21. A method of managing a lease, the method comprising:
executing instructions stored in memory of a monitoring and recording agent, the monitoring and recording agent being identified by a data analyzer, the data analyzer made accessible to an agent database, wherein execution of the instructions by a processor of the monitoring and recording agent:
   automatically detects a plurality of printers in a computing network, each of the plurality of printers manufactured by a variety of manufacturers, the automatic detection including the detection of printers that have been newly installed onto the computing network,
   broadcasts a message onto the computing network on a periodic basis to solicit responses from each of the detected printers,
   automatically monitors usage and status of a plurality of leased printing devices on a network, the usage determined on an individual user basis using an identifier unique to the individual user, the usage associated with a lease rate given to each of the detected printers, the usage used to establish the lease rate for the individual user, automatically records usage and status of a plurality of leased printing devices on a network,
   automatically generates a message concerning the usage and status, and
   automatically sends the message from the monitoring and recording agent over a computing network to a control system, wherein the control system:
   records usage and status of a plurality of leased printing devices on a network,
   stores a report recipient database in memory, the report recipient database including information concerning a plurality of report recipients, each report recipient being designated to receive a type of report, the type of report selected from the group comprising a purchase order, a maintenance request, a reseller request, and a lessor report,
   analyzes the message to determine a type of report that should be generated in response to the message, and
   automatically generates the determined type of report for sending to the designated report recipient associated with the type of report; and
a second monitoring and recording agent executable by the processor to:
   automatically monitor a second network of printing devices,
   automatically record the second network of printing devices,
   collect further usage information and status information from the printing devices on the second network,
   record the further usage information and status information from the printing devices on the second network, and
   assemble messages including the further usage information and status information, wherein the control system is further configured to distinguish messages received from the first monitoring and recording agent from messages received from the second monitoring and recording agent.

22. The method of claim 21, wherein communication between the monitoring and recording agent and the control system is one-way through a firewall.

23. The method of claim 21, wherein automatically generating the purchase order, maintenance request or report includes generating a reseller report configured for a reseller to determine a commission for the lease.

24. The method of claim 21, wherein automatically generating the purchase order, maintenance request or report includes generating a lessor report, the lessor report including an amount to charge a lessee of the plurality of leased printing devices.

25. The method of claim 21, wherein automatically monitoring and recording usage and status includes collecting different information from different printers.

* * * * *